United States Patent [19]
Schwarz et al.

[11] Patent Number: 5,942,730
[45] Date of Patent: Aug. 24, 1999

[54] THREADED CABLE JOINT

[75] Inventors: Manfred Schwarz, Weil der Stadt; Rolf Drotleff, Sindelfingen, both of Germany

[73] Assignee: U.I. Lapp GmbH & Co. KG, Stuttgart, Germany

[21] Appl. No.: 08/911,065

[22] Filed: Aug. 14, 1997

[51] Int. Cl.⁶ .................................................. H02G 15/02
[52] U.S. Cl. ..................... 174/84 R; 174/78; 174/88 C
[58] Field of Search ................................. 174/84 R, 78, 174/88 C

[56] References Cited

U.S. PATENT DOCUMENTS 5,059,747  10/1991  Bawa et al. ................................ 174/65

FOREIGN PATENT DOCUMENTS

| | | |
|---|---|---|
| 0 093 524 | 11/1983 | European Pat. Off. . |
| 0 704 940 | 4/1996 | European Pat. Off. . |
| 37 08 493 | 6/1988 | Germany . |
| 40 31 553 | 4/1992 | Germany . |
| 92 04 291 | 6/1992 | Germany . |
| 0 598 261 | 5/1994 | Germany . |
| 2 233 838 | 1/1991 | United Kingdom . |

*Primary Examiner*—Dean A. Reichard
*Assistant Examiner*—William H Mayo, III
*Attorney, Agent, or Firm*—Barry R. Lipsitz; Ralph F. Hoppin

[57] ABSTRACT

A threaded cable joint for a cable having a cable shield enclosing an internal conductor region. The cable joint, which may be connected to a housing, has a connection piece and an outer pressure element. The outer pressure element is screw-connected to the connection piece, and acts on a seal to cause the seal to abut against the cable as the cable passes through the threaded cable joint. A number of shield contact elements are arranged within the connection piece, and in electrical contact with the connection piece. The shield contact elements include conductive contact bows that extend in the direction of the passed-through cable for contacting the cable shield at a first contact point, thus forming a direct electrical connection between the cable shield and the connection piece.

26 Claims, 2 Drawing Sheets

THREADED CABLE JOINT

BACKGROUND OF THE INVENTION

The invention relates to a threaded cable joint comprising a connection piece, which may in particular be connected to a housing, a seal, which may be inserted into an interior portion of the connection piece, and a pressure element, which may be screw-connected to the connection piece and acts on the seal in the sense of abutting this against a cable passed through the threaded cable joint.

Such threaded cable joints are known from the prior art. In these, the seal serves on the one hand to tightly enclose the cable and partially fix it non-positively against tension.

The disadvantage of such threaded cable joints is that when cables are used with a cable shield, no direct connection can be formed between the connection piece and the cable shield.

Therefore, the object of the invention is to improve a threaded cable joint of the generic type in such a way that a direct electrical connection may be formed between the cable shield and the connection piece.

SUMMARY OF THE INVENTION

This object is achieved in a threaded cable joint of the above-described type according to the invention in that a shield contact element is arranged in the connection piece which is in electrical contact with the connection piece and by means of a contact bow extending in the direction of the passed-through cable contacts, at a first contact point, a cable shield enclosing an internal conductor region of the cable.

The advantage of the solution according to the invention is that a direct connection may be formed between the connection piece and the cable shield enclosing the internal conductor region of the cable by the shield contact element arranged in the connection piece, in which case the cable shield does not have to be detached from the internal conductor area of the cable for this purpose, only an outer cable sheath surrounding the cable shield has to be removed.

With this solution, an electrical contact may be formed between the cable shield and the connection piece in a particularly simple manner, even with cables of different diameter, i.e. because the cable end with the outer cable sheath partially removed around the cable shield merely has to be inserted into the threaded cable joint and can be fixed by the seal, in which case the contact bow enables reliable contacting even with a different position of the cable shield dependent on the diameter of the cable.

In principle, the contact bow can have highly diverse mobility in this case. It is particularly advantageous if the contact bow is movable in a plane running approximately parallel to a longitudinal axis of the threaded cable joint. This plane should be understood to mean a plane in which the contact bow extends in all positions determined by the mobility.

In principle, it would be sufficient if the shield contact element has a single contact bow. However, it is particularly advantageous if the shield contact element has several contact bows, which are arranged, for example, at constant angular spacings around the longitudinal axis of the threaded cable joint.

A wide variety of solutions are possible with respect to the formation of an electrical connection between the contact bow and the connection piece. Hence, it would be conceivable, for example, that the contact bow is electrically connected to the connection piece via an element supporting it.

However, it is even more advantageous if the contact bow directly contacts the connection piece at a second contact point so that as direct a connection as possible may be formed between the cable shield and the connection piece.

It is particularly advantageous here if the contact bow has a knee-like bend which lies between the first and the second contact point.

The knee-like bend may be used particularly advantageously to generate a spring action, i.e. as a result of the contact bow being made from a resilient material at least in the region of the knee-like bend.

Such a knee-like bend then advantageously serves to abut the contact bow both in the region of the first contact point and in the region of the second contact point against the cable shield or the connection piece with sufficient force to produce a good electrical contact.

In order to achieve simple insertion of the cable with the cable sheath removed, but with the cable shield still enclosing the internal conductor region and lying thereon, upon generation of as good an electrical contact as possible in the region of the first contact point, it is preferably provided that in the region of the first contact point, the contact bow has a bend like the runner of a sledge which prevents the cable shield from being detached as a result of the contact bow upon its insertion.

In addition, to achieve as good an electrical contact as possible in the region of the second contact point, it is preferably provided that in the region of the second contact point, the contact bow has a bend which serves to maintain as good an electrical contact as possible through as small a contact surface as possible even with low pressure forces.

It has only been discussed in conjunction with the previous description of the individual embodiments that the shield contact element has one or more contact bows. However, it is particularly advantageous if the shield contact element has a support part, against which the contact bows are held.

In this case, the support part is preferably constructed as a part curved in the shape of a ring. The support part may be made particularly expediently, in particular together with the contact bows, if it is curved from a flat material strip which has the shape of an open ring.

A particularly advantageous embodiment with respect to the construction of the shield contact element provides that the contact bow is movable relative to the support part, and that the support part is arranged to be fixed relative to the connection piece. Such a shield contact element has the advantage that there is the possibility, on the one hand, of positioning the contact bows exactly in the connection piece via the support part and, on the other hand, the contact bows are sufficiently movable relative to the support part to form a good electrical contact between the cable shield and the connection piece.

A particularly advantageous embodiment provides that the support part lies at a distance from an inside wall of the connection piece and the contact bow extends from the support part to one contact point and then to the other, so that the contact bow has sufficient space for movement extending from the support part both in the direction of the inside wall of the connection piece and in the direction of the cable shield to balance different dimensions as a result of elastic deformation.

A particularly simple method of assembly of the shield contact element provides that this may be inserted into the connection piece from an end thereof on the housing side, since it is thus possible to assemble the threaded cable joint completely independently of whether the shield contact element is present or absent. For example, it is possible in this case to assemble a threaded cable joint, on the one hand, with a seal and the pressure element acting on this, and either use it with the shield contact element or not, depending on the intended use.

It is particularly expedient in this case if the shield contact element may be fixed locally in the connection piece so that the shield contact element can be constructed in a simple manner in order to achieve defined positioning of the shield contact element in the connection piece.

It is particularly expedient here if the shield contact element may be fixed on the connection piece via a catch connection.

The shield contact element itself may be directly held in the connection piece, e.g. by local fixture of the support part in the connection piece.

However, it is particularly advantageous if the shield contact element is held on an insert part which may be inserted into the connection piece, since such a solution has the advantage that positioning of the shield contact element in the connection piece may be achieved simply by means of the insert part. For example, the insert part may be constructed from the same material or from another material and in another shape as/than the shield contact element, which is preferably made from appropriately curved metal flat material.

For example, the insert part is preferably a plastics part.

A particularly simple insertion of the insert part, in particular independently of the seal, is possible when the insert part may be inserted into the connection piece from an end thereof on the housing side, since the threaded cable joint can then be assembled completely independently of whether the insert part is present or absent. For example, it is possible in this case to assemble a threaded cable joint, on the one hand, with a seal and the pressure element acting on this, and either use the insert part with the shield contact element or not, depending on the intended use.

It is particularly expedient in this case if the shield contact element may be fixed locally in the connection piece by means of the insert part so that the insert part can be constructed in a simple manner in order to achieve defined positioning of the shield contact element in the connection piece.

It is particularly expedient here if the insert part may be fixed on the connection piece via a catch connection.

The shield contact element may be positioned particularly favourably by holding this on the insert part by means of the support part sitting on the insert part.

It is preferably provided that the support part is fixed non-positively on the insert part.

The threaded cable joint according to the invention can be constructed in a wide variety of ways with respect to the construction of the seal. Thus, it is conceivable, for example, to use a pressure screw as pressure element and a seal, which may be deformed by pressing in axial direction and may be brought into abutment against a cable passing through a passage, as seal.

Alternatively, it is provided in an advantageous embodiment that a seal support with a leaf segment cage held against this, and that a seal lies in the leaf segment cage.

In this case, the pressure element is preferably constructed as cap nut engaging over the leaf segment cage which acts on the leaf segment cage so that this presses the seal in the direction of a longitudinal axis of the threaded cable joint in order to bring the seal into abutment against an outer cable sheath of the led through cable.

Further features and advantages of the invention are the subject of the following description and of the drawing of an embodiment.

DETAILED DESCRIPTION OF THE INVENTION

Figure 1:
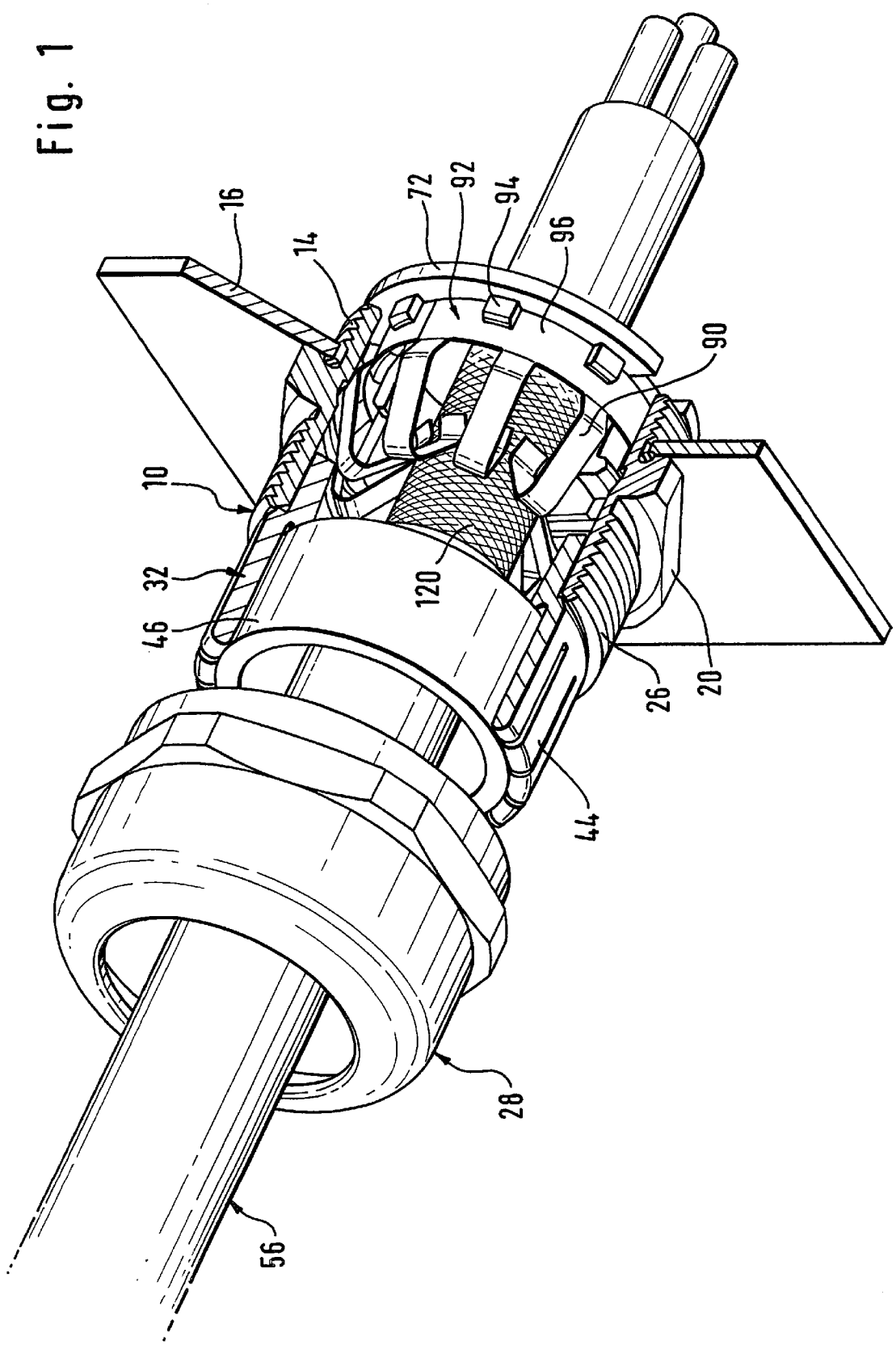
FIG. 1 is a perspective, partially cut-open representation of an embodiment of the threaded cable joint according to the invention.
Figure 2:
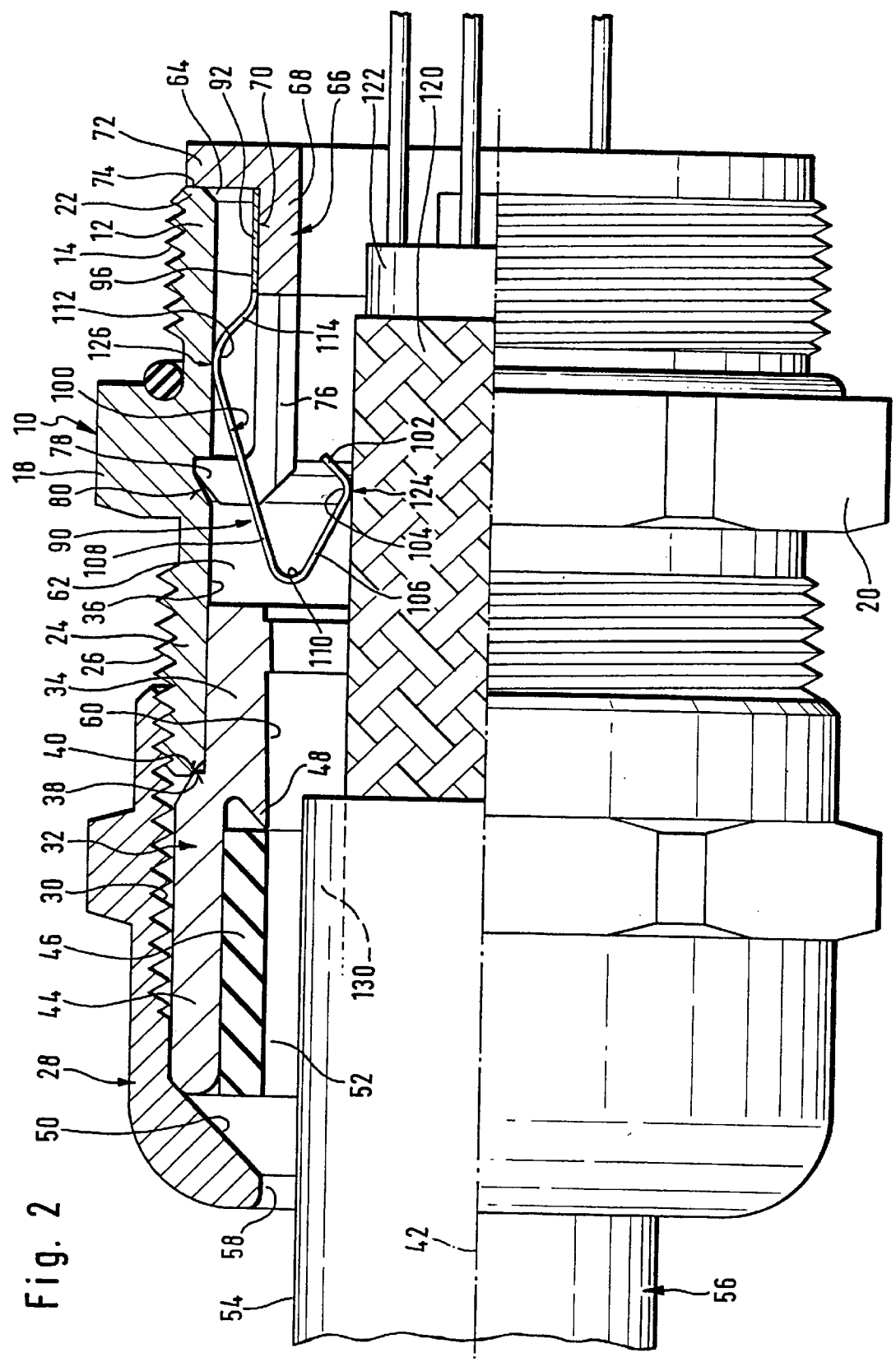
FIG. 2 is a unilateral longitudinal section through the embodiment shown in FIG. 1.

An embodiment of a threaded cable joint shown in FIGS. 1 and 2 comprises a connection piece constructed to be electrically conductive, which is given the overall reference 10 and which has a cylindrical attachment 12 with an external thread 14, with which the connection piece 10 may be screwed into a wall 16 of a housing, for example.

Moreover, the connection piece comprises a key face section 18, which is provided with key faces 20 and directly adjoins the cylindrical attachment 12 on a side opposite an end 22 of the cylindrical attachment 12 on the housing side.

A cylinder section 24 bearing an external thread 26 is provided on a side of the key face section 18 of the connection piece 10 opposite the cylindrical attachment 12. A cap nut 28, given the overall reference 28, may be screwed with its internal thread 30 onto the external thread 26.

The cylinder section 24 serves to receive a seal support, given the overall reference 32, which engages into the cylinder section 24 with a holding attachment 34 and is mounted on an inside cylinder face 36 thereof. Moreover, the seal support 32 is supported at a flange face 38 on a face side 40 of the cylinder section 24 facing away from the key face section 18 and is thus fixed in the direction of a longitudinal axis of the threaded cable joint according to the invention against displacement in the direction of the key face section 18.

The seal support 32 further comprises a leaf segment cage 44, which itself encloses a seal 46, in which case the seal 46 may, moreover, be fixed by an inside attachment 48 against a displacement in the direction of the longitudinal axis 42 towards the key face section 18.

The leaf segment cage 44 may itself be acted upon by a sloping face 50 of the cap nut 28, which when the cap nut 28 is increasingly tightened onto the external thread 26, deforms the leaf segments of the leaf segment cage 44 increasingly in the direction of the longitudinal axis 42, and thus also moves the seal 46 receiving the leaf segment cage 44 so far in the direction of the longitudinal axis 42 that an inside passage 52 may be abutted against an outer cable sheath surface 54 of a cable 56 with pressure to form a seal.

The cable 56 in this case runs through an opening 58 of the cap nut 28 coaxial to the longitudinal axis 42, then through the passage 52 of the seal 46, and then passes through an inside opening 60 of the seal support 32. Adjoining the seal support 32, the cable 56 extends through an interior portion 62 of the connection piece 10, which expands from the cylinder section 24 through the key face section 18 and the cylindrical attachment 12 as far as an opening 64 of the connection piece on the housing side. An insert part, given the overall reference 66, extends in the interior 62 from the opening 64 on the housing side, said insert part having an annular body 68 with a radially external cylindrical face 70 and a flange 72 extending radially outwards over the cylindrical face 70 and abutting against a face 74 of the end 22 of the connection piece 10 on the housing side.

The insert part 66 additionally has fingers 76 extending from the inside body 68 and extending in the direction of the longitudinal axis 42, said fingers engaging with a detent 78 standing radially outwards in relation to the longitudinal axis 42 into a groove 80 in the connection piece 10 which preferably lies in the region of the key face section 18 and extends radially outwards from the inside cylinder face 36.

The insert part 66 may thus be inserted from the end 22 on the housing side into the interior 62 of the connection piece 10, in which case the fingers 76 may be elastically bent in the direction of the longitudinal axis 42 so that the detents 78 thereof slide along on the inside cylindrical face 36 from the opening 64 as far as the groove 80, and then engage into the groove 80, thus forming a catch connection with this, while at the same time the flange 72 abuts against the end 22 of the connection piece 10 on the housing side.

The insert part 66 supports a shield contact element, given the overall reference 90, which lies on the cylindrical face 70 of the annular body 68 with a support part 92 constructed in the form of an open ring, in which case the support part 92 is a flat: material strip bent into an open ring. For fixture of the support: part 92 on the cylinder face 70, the support part 92 is held by projections 94 projecting from the flange 72 which engage over the support part 92 on an outside 96 facing away from the cylindrical face 70, so that the support part is fixed in a slot formed between the projections 94 and the cylindrical face 70.

Contact bows 100 located between the fingers 76 extend from the support part 92, said contact bows having an end 102 facing away from the support part 92 with a V-shaped bend arranged on a first: bow arm 106. The first bow arm 106 and a second bow arm 108 are connected to one another via a knee-like bend 110. The second bow arm 108 adjoins a bend 112 in the shape of an inverted V and this lies between a third bow arm 114 extending radially outwards away from the support part 92 in relation to the longitudinal axis 42 and a s second bow arm 108.

Each contact bow 100 serves to form an electrical contact between a cable shield 120, which abuts against an internal conductor region 122 of the cable 56 and encloses this. The term internal conductor region 122 relates to all the sub-components enclosed by the cable shield 120. For this, the contact bow 100 with the V-shaped bend 104 touches the cable shield 120 at a first contact point 124. Moreover, each contact bow 100 preferably extends in a plane running through the longitudinal axis 42 and is resiliently movable lying in the plane, whereby the bow arms 106, 108 and 114 remain lying in the plane.

In addition, the contact bow 100 touches the connection piece 10 in the region of its inside cylindrical face 36 by means of the bend 112 in the form of an inverted V forming a second contact point 126. Because of the shape of the contact bow 100 the knee-like bend 110 lies between the first contact point 124 and the second contact point 126 with the first bow arm 106 leading away from said bend and the second bow arm 108, which, in the case of elastic material of the contact arm, performs a spring action, which on the one hand presses the bend 104 against the cable shield 120 and on the other hand presses the bend 112 against the inside cylindrical face 36 of the connection piece 10, and thus also maintains the electrical contact in the region of the first contact point 124 and the second contact point 126.

Because the third bow arm 114 runs radially outwards from the support 92 as far as the bend 112 in the form of an inverted V, a lever arm is also formed between the support part 92 and the bend 112 which permits a resilient movement of the bend 112 in the direction of the inside cylindrical face 36 of the connection piece 10, so that as a result of the structure of the contact bow 100 made of resilient material, both a contact in the region of the first contact point 124 and a contact in the region of the second contact point 126 are constantly maintained. Therefore, with the threaded cable joint according to the invention it is merely necessary to remove an outer cable sheath 130 sufficiently so that the cable shield 120 enclosing the internal conductor area 122 is exposed, but still closely encloses the internal conductor area 122. If a cable thus partially freed from the outer cable sheath 130 is inserted into the threaded cable joint according to the invention, i.e. so far that the exposed cable shield 120 lies in the region of the interior 62, then an electrical contact is automatically formed between the cable shield 120 and the connection piece 10 by means of the number of contact bows 100. In this case, the cable is preferably inserted so far that the area still provided with the outer cable sheath 130 lies in the passage 52 of the seal 46, so that the seal 46 may be brought into abutment against the outer cable sheath face 54 by tightening the cap nut 28, and thus the cable 56 is sealed in the threaded cable joint on the one hand and may be fixed non-positively so as to be relieved from tension on the other hand, while at the same time an electrical contact may be formed between the cable shield 120 and the connection piece 10 via the contact bows 100.

What is claimed is:

1. A threaded cable joint for a cable having a cable shield enclosing an internal conductor region, comprising:

a connection piece having a housing portion at one end thereof and a threaded outer portion at an other end thereof;

said housing portion being adapted to be secured to a housing wall;

wherein a common longitudinal axis extends though said housing portion and said outer portion;

a seal element inserted into said outer portion;

a pressure element screw-connected to said threaded outer portion and adapted to act on said seal element by abutting said seal element against a cable passing through said cable joint along said longitudinal axis; and a shield contact element in electrical contact with said connection piece and comprising at least one contact member extending in a direction transverse to said longitudinal axis; wherein:

said at least one contact member is adapted to contact a cable shield to provide an electrical connection between said cable shield and said connection piece; and said at least one contact member is received and secured in said housing portion and is always independent of said seal element.

2. A threaded cable joint according to claim 1, wherein:

said contact member is resiliently movable relative to said longitudinal axis in a plane running approximately parallel to said longitudinal axis.

3. A threaded cable joint according to claim 1 wherein:
said shield contact element comprises a plurality of said contact members extending transverse to said longitudinal axis and adapted to contact said cable shield to provide an electrical connection between said cable shield and said connection piece.

4. A threaded cable joint according to claim 1, wherein:
said at least one contact member directly contacts said connection piece.

5. A threaded cable joint according to claim 1, wherein:
said contact member comprises a contact finger.

6. A threaded cable joint for a cable having a cable shield enclosing an internal conductor region, comprising:
- a connection piece having a housing portion at one end thereof and a threaded outer portion at an other end thereof;
- said housing portion being adapted to be secured to a housing wall;
- wherein a common longitudinal axis extends though said housing portion and said outer portion;
- a seal element inserted into said outer portion;
- a pressure element screw-connected to said threaded outer portion and adapted to act on said seal element by abutting said seal element against said cable passing through said cable joint along said longitudinal axis; and
- a shield contact element in electrical contact with said connection piece and comprising at least one contact bow extending in a direction transverse to said longitudinal axis; wherein:
  - said at least one contact bow is adapted to contact a cable shield to provide an electrical connection between said cable shield and said connection piece;
  - said at least one contact bow has a knee-like bend between said electrical contact with said cable shield and said electrical contact with said connection piece;
  - said at least one contact bow is resiliently movable relative to said connection piece; and
  - said housing portion of said connection piece receives and secures said shield contact element, with said shield contact element always being independent of said seal element.

7. A threaded cable joint according to claim 6, wherein:
said contact bow has a further bend in a region of said contact with said cable shield.

8. A threaded cable joint according to claim 6, wherein:
said contact bow has a further bend in a region of said contact with said connection piece.

9. A threaded cable joint according to claim 6, wherein:
said shield contact element has a support part, on which the at least one contact bow is held.

10. A threaded cable joint according to claim 9, wherein:
said at least one contact bow is resiliently movable relative to said support part; and
said support part is fixed relative to said connection piece.

11. A threaded cable joint according to claim 9, wherein:
said support part lies at a distance from an inside wall of said connection piece; and
said at least one contact bow extends from said support part to said contact with said connection piece and then to said contact with said cable shield.

12. A threaded cable joint according to claim 6, wherein:
said shield contact element has a plurality of said contact bows extending transverse to the direction of said longitudinal axis and adapted to contact said cable shield to provide an electrical connection between said cable shield and said connection piece.

13. A threaded cable joint according to claim 6, wherein:
said at least one contact bow directly contacts said connection piece.

14. A threaded cable joint according claim 6, wherein:
said at least one contact bow is arranged in said housing portion and fixed with respect to said housing portion independant of said seal element.

15. A threaded cable joint according to claim 6, wherein:
said contact bow is resiliently movable relative to said longitudinal axis in a plane running approximately parallel to said longitudinal axis.

16. A threaded cable joint for a cable having a cable shield enclosing an internal conductor region, comprising;
- a connection piece having a housing portion and a threaded outer portion;
- said housing portion being adapted to be secured to a housing wall;
- wherein a common longitudinal axis extends though said housing portion and said outer portion;
- a seal element inserted into said outer portion;
- a pressure element screw-connected to said threaded outer portion and adapted to act on said seal element by abutting said seal element against a cable passing through said cable joint along said longitudinal axis; and
- a shield contact element in electrical contact with said connection piece and comprising at least one contact element extending in a direction transverse to said longitudinal axis; wherein:
  - said at least one contact element is adapted to contact a cable shield to provide an electrical connection between said cable shield and said connection piece; and
  - said housing portion of said connection piece has an open end through which said shield contact element is adapted to be inserted, said open end being accessible for insertion of said shield contact element independent of an assembling of said pressure element and said seal element.

17. A threaded cable joint according to claim 16, wherein:
said contact element comprises a contact finger.

18. A threaded cable joint according to claim 16, wherein:
said shield contact element is adapted to be fixed locally in said connection piece.

19. A threaded cable joint according to claim 16, further comprising:
a catch connection for fixing said shield contact element locally in said connection piece.

20. A threaded cable joint according to claim 16, wherein:
said at least one contact element is arranged in said housing portion and secured to said housing portion independent of said seal element.

21. A threaded cable joint according to claim 16, further comprising:
an insert part which is inserted into said connection piece for holding said shield contact element.

22. A threaded cable joint according to claim 21, wherein:
said insert part is inserted into said connection piece from said open end thereof at said housing portion.

23. A threaded cable joint according to claim 21, further comprising:

a support part sitting on the insert part for holding said shield contact element on said insert part.

24. A threaded cable joint according to claim 21, wherein:

said shield contact element is fixed locally in said connection piece by said insert part.

25. A threaded cable joint according to claim 24, further comprising:

a catch connection for fixing said insert part at said connection piece.

26. A threaded cable joint according to claim 1, wherein in said connection piece is a unitary piece including said housing portion and said threaded outer portion.

* * * * *